United States Patent
Saito et al.

(10) Patent No.: US 11,933,407 B2
(45) Date of Patent: Mar. 19, 2024

(54) COMPRESSION RING

(71) Applicant: KABUSHIKI KAISHA RIKEN, Tokyo (JP)

(72) Inventors: Hiroaki Saito, Kashiwazaki (JP); Yoshio Okada, Kashiwazaki (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 17/784,434

(22) PCT Filed: Dec. 3, 2020

(86) PCT No.: PCT/JP2020/045058
§ 371 (c)(1),
(2) Date: Jun. 10, 2022

(87) PCT Pub. No.: WO2021/117599
PCT Pub. Date: Jun. 17, 2021

(65) Prior Publication Data
US 2023/0013831 A1 Jan. 19, 2023

(30) Foreign Application Priority Data
Dec. 11, 2019 (JP) .................................. 2019-223850

(51) Int. Cl.
*F16J 9/26* (2006.01)
*F16J 9/12* (2006.01)

(52) U.S. Cl.
CPC .. *F16J 9/26* (2013.01); *F16J 9/12* (2013.01)

(58) Field of Classification Search
CPC ...................... F16J 9/00; F16J 9/12; F16J 9/26
See application file for complete search history.

(56) References Cited

U.S. PATENT DOCUMENTS

| 5,380,018 A | 1/1995 | Mader et al. |
| 5,934,680 A * | 8/1999 | Kakehi ..................... F16J 9/14 |
| | | 277/499 |

(Continued)

FOREIGN PATENT DOCUMENTS

| JP | 2001-271928 A | 10/2001 |
| JP | 2001-295927 A | 10/2001 |

(Continued)

OTHER PUBLICATIONS

International Search Report for PCT/JP2020/045058 dated Jan. 12, 2021.

(Continued)

*Primary Examiner* — Gilbert Y Lee
(74) *Attorney, Agent, or Firm* — Birch, Stewart, Kolasch & Birch, LLP

(57) ABSTRACT

To provide a long-life compression ring without an increase in the outer peripheral abrasion near the gap regardless of the ring material or the presence or absence of the outer peripheral hard coating, in an annular compression ring having a pair of gap faces opposed to each other to form a free gap and a nominal diameter d1 equal to an inner diameter of a cylinder to which the compression ring is attached to along with a piston, a self tangential force is 5N to 50N, and a radius of curvature R1 and the nominal diameter d1 satisfy a relationship:

$-0.01 \leq (2R1-d1)/d1 < 0.002$ where the radius of curvature R1 is that of outer peripheral arcs of gap end portions in a free shape state before the compression ring is attached to the cylinder, and the gap end portions are defined in ranges between the gap faces and positions where a center angle from a midpoint of the free gap is 35°.

9 Claims, 4 Drawing Sheets

(56) References Cited

U.S. PATENT DOCUMENTS

| | | | |
|---|---|---|---|
| 2002/0074733 A1 | 6/2002 | Negishi et al. | |
| 2009/0026711 A1 | 1/2009 | Urabe et al. | |
| 2012/0228831 A1 | 9/2012 | Herbst-Dederichs et al. | |
| 2016/0238133 A1* | 8/2016 | Sato | C23C 28/343 |
| 2018/0187780 A1* | 7/2018 | Natabe | F16J 9/063 |
| 2018/0335141 A1 | 11/2018 | Lemke et al. | |

FOREIGN PATENT DOCUMENTS

| | | |
|---|---|---|
| JP | 2002-115759 A | 4/2002 |
| JP | 2002-266698 A | 9/2002 |
| JP | 2004-278378 A | 10/2004 |
| JP | 2009-30727 A | 2/2009 |
| JP | 2010-84853 A | 4/2010 |
| JP | 2012-154465 A | 8/2012 |

OTHER PUBLICATIONS

Notice of Reasons for Refusal issued in Japanese Patent Application No. 2019-223850 dated Apr. 26, 2022.
Written Opinion of the International Searching Authority for PCT/JP2020/045058 (PCT/ISA/237) dated Jan. 12, 2021.
European Patent Office Communication and extended search report issued in the corresponding European Patent Application No. 20900109.8 dated Nov. 24, 2023.

* cited by examiner

COMPRESSION RING

TECHNICAL FIELD

The present invention relates to a piston ring for an automobile engine, and more particularly to the shape of a compression ring.

BACKGROUND ART

Abrasion on the outer periphery of a compression ring is typically greater near a gap than in other portions, and the life of the compression ring is, in effect, often determined by the amount of outer peripheral abrasion near the gap. For example, a compression ring having an outer peripheral sliding surface coated with a hard coating of high abrasion resistance, such as CrN deposited by ion plating, often comes to its end of life because of excessive abrasion near the gap even if a sufficient thickness of coating remains on the side opposite to the gap. Countermeasures against the abrasion near the gap have a lot of problems, including increased manufacturing costs due to the application of a coating thicker than necessary to the entire ring and, depending on the type of coating, a difficulty in increasing the thickness itself.

To prevent a local increase in the surface pressure near the gap as a countermeasure against the abrasion near the gap, Patent Literature 1 discloses a piston ring, wherein a groove circumferentially extending in the range of ±20° from the gap portion is formed in the inner peripheral face of the piston ring, substantially at a center position between an upper side face and a lower side face. Patent Literature 2 discloses a compression ring, wherein: a flat cutout portion gradually approaching an outer peripheral face toward a gap face is formed on an inner peripheral face side of the compression ring over a predetermined circumferential length portion of 26.5° to 14° for the center angle, starting at the gap face; and a radial thickness of the gap face is from 0.2 times to less than 0.5 times that of a portion other than the predetermined circumferential length portion. Both are intended to reduce the surface pressure near the gap by reducing the modulus of the section of the ring near the gap to lower the bending rigidity.

Meanwhile, attempts have also been made to reduce the surface pressure near the gap to control the pressure pattern of the ring, while paying attention to the shape of the ring in a free state instead of the modulus of the section of the ring. Patent Literature 3 discloses a piston ring, wherein: a value ($R_{max}/R_{180}$) obtained by dividing a distance ($R_{max}$) to an outermost point where the distance between a cylinder center and an inner peripheral face of the piston ring becomes maximum by a distance ($R_{180}$) from the cylinder center to an antipodal point located opposite to a gap, 180° rotated from the midpoint between both ends of the gap, is 1.032 to 1.040; a value ($R_{gap}/R_{180}$) obtained by dividing a distance ($R_{gap}$) from the cylinder center to one end of the gap by the distance ($R_{180}$) from the cylinder center to the antipodal point is 1.032 to 1.040; and the position of the outermost point is 44.7° to 46.1° from the midpoint. Patent Literature 4 discloses a piston ring having a free gap defined by opposed gap faces and a predetermined nominal radius. The piston ring includes first length portions having a center angle of at least 15° and less than 25° from both ring gap faces, and second length portions adjoining the respective first length portions and having a center angle of approximately 10°. In a free unattached state, the first length portions have a radius of curvature 0% to 2% smaller than the nominal radius, and the second length portions have a radius of curvature smaller than that of the first length portions. The entire circumference of the piston ring is thereby light-tightly attached to a cylinder, a radial pressure distribution of the piston ring in an attached state is substantially zero at the closed gap and increases to a maximum value of that of the second length portions away from the gap, and the maximum value is greater than 200% of a circumferential average of the radial pressure distribution of the piston ring in the attached state.

However, Patent Literatures 1 and 2 complicate the manufacturing steps and increase costs since the inner peripheral side of the piston ring needs to be further machined. Patent Literature 3 with its disclosed requirements alone does not guarantee uniform surface pressure across the entire circumference of the piston ring in actual operations since the radius of curvature the outer peripheral face of the piston ring has when attached to the cylinder depends on Young's modulus and the tangential force of the piston ring. Patent Literature 4 is insufficient for the reduction of abrasion even while the ring flutter at the gap end portions can be suppressed since the surface pressure increases in the areas of 25° to 35° from the gap.

CITATION LIST

Patent Literature

Patent Literature 1: Japanese Patent Application Laid-Open No. 2004-278378
Patent Literature 2: Japanese Patent Application Laid-Open No. 2009-030727
Patent Literature 3: Japanese Patent Application Laid-Open No. 2010-084853
Patent Literature 4: U.S. Pat. No. 5,380,018

SUMMARY OF THE INVENTION

Problem to be Solved by the Invention

In view of the foregoing circumstances, it is an object of the present invention to provide a long-life compression ring without an increase in the outer peripheral abrasion near the gap regardless of the ring material or the presence or absence of the outer peripheral hard coating.

Means for Solving the Problem

As a result of intensive studies to solve the foregoing problems with the shape of a compression ring in a free state, the inventors have successfully obtained a long-life compression ring without an increase in the outer peripheral abrasion near the gap basically by shaping the ring so that its radius of curvature decreases gradually from the side opposite to the gap toward the gap end portions in a free shape state before the ring is attached to a cylinder, and in particular by investigating the relationship between the radius of curvature of the outer peripheral face of the ring near the gap and the nominal diameter, to reduce the surface pressure near the gap without changing the modulus of the section of the compression ring. Consequently, the present inventors have completed the present invention.

More specifically, a compression ring according to the present invention is an annular compression ring having a pair of gap faces opposed to each other to form a free gap and a nominal diameter d1 equal to an inner diameter of a cylinder to which the compression ring is attached to along with a piston, wherein a self tangential force is 5 N to 50 N, and a radius of curvature R1 and the nominal diameter d1 satisfy a relationship:

$$-0.01 \leq (2R1-d1)/d1 < 0.002$$

where the radius of curvature R1 is that of the outer peripheral arcs of gap end portions in a free shape state before the compression ring is attached to the cylinder; and the gap end portions are defined in ranges between the gap faces and positions where a center angle from a midpoint of the free gap is 35°.

The radius of curvature R1 and the nominal diameter d1 preferably satisfy a relationship:

$$-0.01 \leq (2R1-d1)/d1 < 0.$$

In the compression ring, when the compression ring is inserted into an annular flexible tape and the flexible tape is drawn to close the compression ring until the closed gap becomes a predetermined gap in a case where the compression ring is attached to the cylinder, an ovality defined as a difference (d3−d4) and the nominal diameter d1 preferably satisfy a relationship:

$$-0.013 \leq (d3-d4)/d1 < 0$$

where d3 is a diameter in a first axial direction through the midpoint of the closed gap and d4 is a diameter in a second axial direction orthogonal to the first axial direction.

The compression ring, when a light tightness test defined by ISO 6621-2:2003(E) is performed, preferably has a light passing portion between an inner peripheral face of a ring gauge used in the light tightness test and the outer peripheral face of the compression ring, and a range of a circumferential length of the light passing portion excluding the closed gap is preferably less than 35% of an inner peripheral length of the ring gauge. Moreover, radial gaps between the outer peripheral face of the compression ring in the light passing portion and the inner peripheral face of the ring gauge at outer peripheral positions 1 mm away from the pair of gap faces are preferably smaller than 0.13% of the nominal diameter d1.

The compression ring preferably includes at least one coating selected from the group consisting of a plating film, an ion plating film, and a nitrided layer on at least an outer peripheral sliding surface. The ion plating film is preferably at least one film selected from the group consisting of CrN, $Cr_2N$, TiN, CrCN, TiCN, and a diamond like carbon.

Advantageous Effect of the Invention

The compression ring according to the present invention can provide a long-life compression ring without an increase in the outer peripheral abrasion near the gap by adjusting the relationship, (2R1−d1)/d1, between the radius of curvature R1 of the outer peripheral arcs of the gap end portions and the nominal diameter d1 of the compression ring in the free shape state before the compression ring is attached to the cylinder. Even with an abrasion-resistant hard coating, a more than necessary increase in thickness is prevented and an increase in manufacturing costs can be reduced.

MODE FOR CARRYING OUT THE INVENTION

A compression ring is typically attached to a piston, and has the function of maintaining the piston and a cylinder wall airtight, or more specifically, the outer peripheral face of the compression ring and the inner wall surface of the cylinder airtight when the piston reciprocates inside the cylinder of an engine. To maintain the airtightness, the compression ring slides over the inner wall surface of the cylinder while maintaining a predetermined surface pressure against the inner wall surface of the cylinder by its self tangential force. The compression ring has a nominal diameter equal to the inner diameter of the cylinder into which the compression ring is inserted along with the piston. To provide the self tangential force for producing the predetermined surface pressure, the compression ring has a free gap more widely open in a free state before the compression ring is attached to the cylinder than in a state where the compression ring is attached to the cylinder. In attaching the compression ring to the cylinder, the compression ring is elastically deformed to close the free gap, and the surface pressure against the inner wall surface of the cylinder is produced as a reaction force.

Figure 1A:
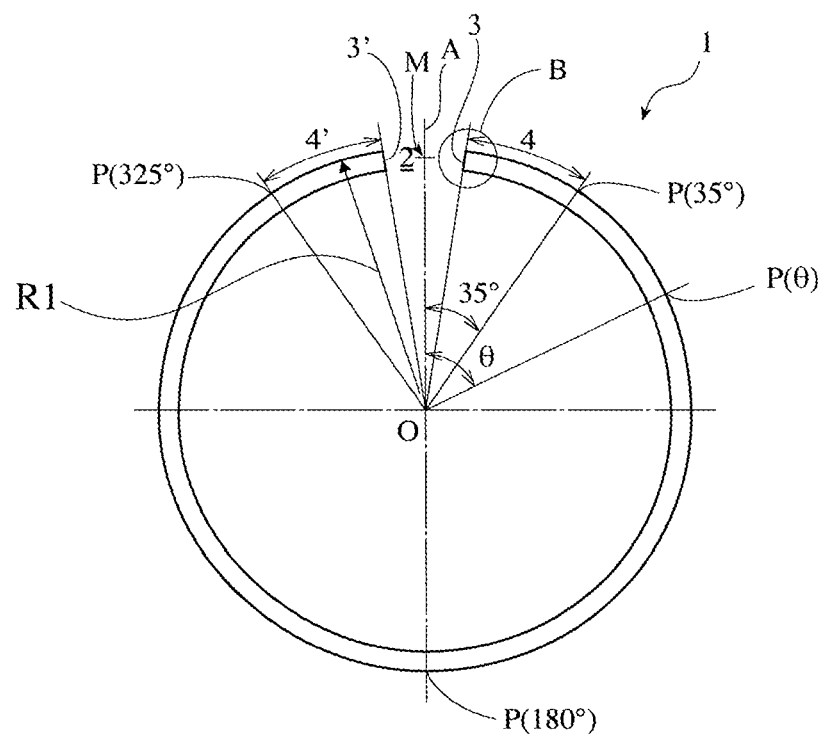
FIG. 1(a) is a diagram showing a free state shape of a compression ring according to the present invention.
Figure 1B:
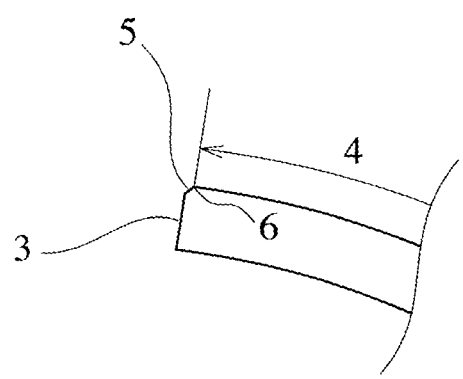
FIG. 1(b) is an enlarged view of a part B in FIG. 1(a), showing an outer peripheral chamfered portion of a gap face.

FIG. 1 shows a free state shape of the compression ring according to the present invention. The compression ring according to the present invention has a pair of gap faces (3, 3') opposed to each other, and a free gap (2) is formed therebetween. To define the shape of the compression ring, focus attention on the outer peripheral arc. A given point (P) on the outer peripheral arc can be expressed as P(θ) using a center angle θ from an axis (A) passing through a midpoint (M) of the free gap (2) and a center point (O), where the center point (O) is the cylinder center when the compression ring is attached to the cylinder. In other words, with the axis A as 0° and the center angle θ clockwise, a point on the outer peripheral arc on the side opposite to the gap is P(180°). Assuming that the gap (free gap) between the pair of gap faces (3, 3') has a center angle of 16°, the points where the gap faces are located on the outer peripheral arc are P(8°) and P(352°). If the tangential force of the compression ring is changed so that the free gap has a center angle of 20°, the points where the gap faces are located on the outer peripheral arc are P(10°) and P(350°). Since the center angle θ between the gap faces varies with the tangential force, a gap end portion (4) on the right of the free gap in FIG. 1(a) will hereinafter be referred to as the "0° side", and a gap end portion (4') on the left as the "360° side". In the compression ring according to the present invention, the gap end portions (4, 4') are defined as ranges from the points on the outer peripheral arc where the gap faces (3, 3') are located (if the gap faces have outer peripheral chamfered portions, points (6, 6') where the gap faces excluding the outer peripheral chamfered portions are located on the outer peripheral arc) to P(35°) and P(325°) where the center angle is 35°. A radius of curvature R1 of the outer peripheral arc of the gap end portions (4, 4') and a nominal diameter d1 of the compression ring satisfy the relationship:

$$-0.01 \leq (2R1-d1)/d1 < 0.002.$$

The radius of curvature R1 and the nominal diameter d1 preferably satisfy the relationship:

$$-0.01 \leq (2R1-d1)/d1 < 0.$$

In other words, the compression ring according to the present invention is preferably designed so that twice the radius of curvature R1 of the outer peripheral arc of the gap end portions is slightly less than the nominal diameter d1.

The above-mentioned design usually is not employed since no surface pressure occurs and the airtight function of the compression ring if 2R1 is less than d1 can become impaired. However, when the compression ring is used in an engine under severe heat load like a diesel engine, the radius of curvature of the outer periphery of the ring changes to produce a surface pressure due to a temperature difference occurring between the inner and outer peripheries of the ring. In the compression ring of the present invention, (2R1−d1)/d1 of 0.002 or more makes the surface pressure near the gap so high that the outer peripheral abrasion near the gap increases. On the other hand, (2R1−d1)/d1 of less than −0.01 causes a blowby issue since the surface pressure can fail to be produced in some portions even with a temperature difference between the inner and outer peripheries of the ring. (2R1−d1)/d1 is preferably −0.006 to 0, yet preferably −0.005 to −0.001, and most preferably −0.004 to −0.002.

The radius of curvature R1 of the gap end portions (4, 4') can be calculated by approximation using the least squares method from coordinate data measured along the outer peripheral arc of the compression ring in a free shape state. While the coordinate data can be obtained by both contact and contactless measurement methods, high-precision results are obtained by contactless measurement using a through-beam laser displacement meter. In the present invention, data is obtained at measurement points every 0.125° along the outer periphery of the ring. For example, with the gap faces (3, 3') at P(8°) or P(352°), the radius of curvature R1 is calculated from 216 pieces of coordinate data up to P(35°).

The compression ring according to the present invention has a self tangential force of 5 N to 50 N. As for dimensions, the compression ring according to the present invention preferably has a nominal diameter d1 of greater than or equal to 65 mm and less than 200 mm, a radial thickness a1 of 2.0 to 5.0 mm, and an axial width h1 of 0.9 to 3.4 mm. Of these, the nominal diameter d1 is preferably 65 to 150 mm, and yet preferably 65 mm to 130 mm. For small-diameter compression rings, the nominal diameter d1 is preferably 65 mm to 88 mm. For large-diameter compression rings, the nominal diameter d1 is preferably 115 mm to 130 mm. Considering both, there may preferably be two classes of nominal diameters d1, 65 mm to 88 mm and 115 mm to 130 mm.

Figure 2:
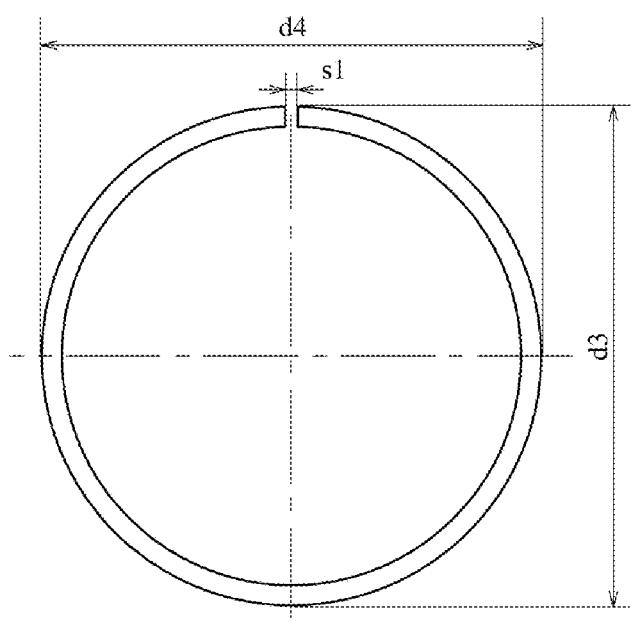
FIG. 2 is a diagram showing the compression ring according to the present invention, closed inside a (not-shown) flexible tape.

To predict the pressure pattern of the compression ring against the inner wall surface of the cylinder, a design index called ovality is typically used. As shown in FIG. 2, the ovality is defined as a difference (d3−d4) between a first diameter d3 connecting the midpoint of the closed gap with the side opposite to the gap and a second diameter d4 orthogonal to the first diameter when the compression ring is inserted into a not-shown annular flexible tape and the flexible tape is drawn to close the compression ring until the closed gap becomes a predetermined gap (s1) in a case where the compression ring is inserted into the cylinder. If the ovality (d3−d4) is positive, the surface pressure near the gap tends to increase. In the compression ring according to the present invention, the ovality (d3−d4) is thus preferably set to be negative. The ovality (d3−d4) and the nominal diameter d1 preferably satisfy the relationship:

$$-0.013 \leq (d3-d4)/d1 < 0$$

(d3−d4)/d1 is preferably −0.009 to 0, yet preferably −0.007 to −0.001, and most preferably −0.005 to −0.002.

The parameter related to the radius of curvature of the free shape, (2R1−d1)/d1, and the parameter related to the ovality, (d3−d4)/d1, are closely related to the pressure pattern near the gap. If (d3−d4)/d1 has a large negative value, the surface pressure can be adjusted to be low even with (2R1−d1)/d1 being positive. If (2R1−d1)/d1 is −0.006 to 0, (d3−d4)/d1 is preferably −0.007 to −0.001.

Figure 3A:
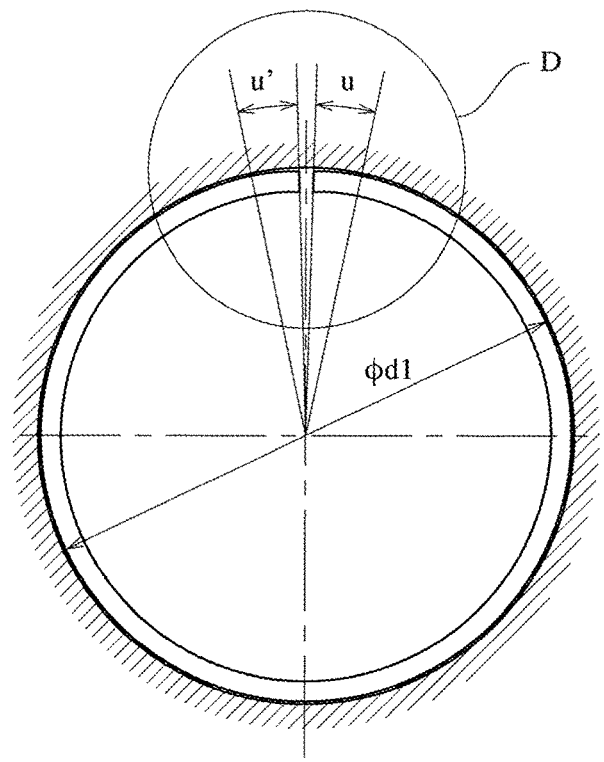
FIG. 3(a) is a diagram showing the compression ring according to the present invention inside a ring gauge used in a light tightness test.
Figure 3B:
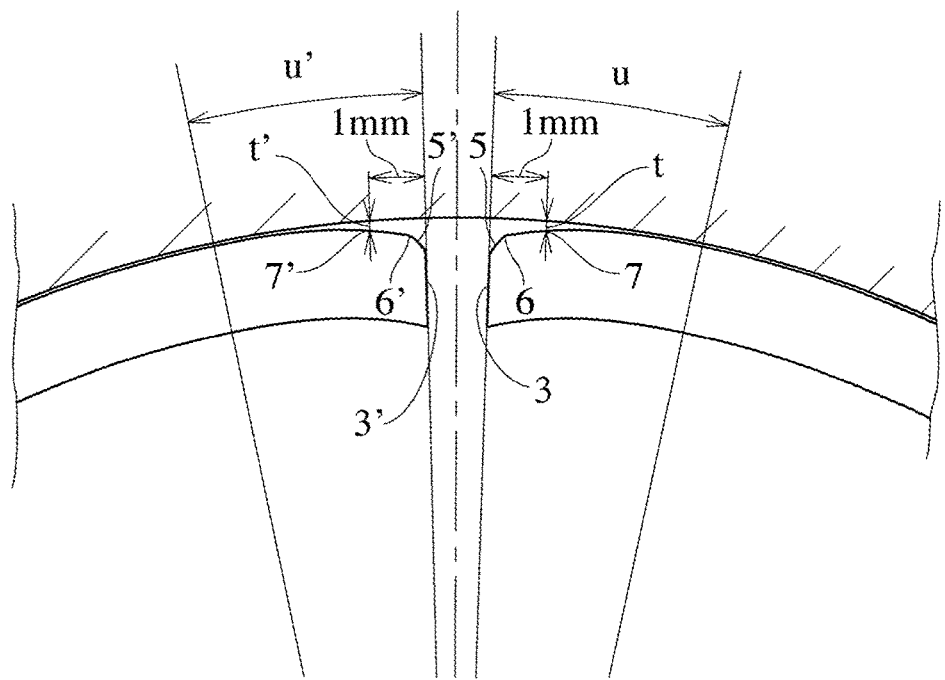
FIG. 3(b) is an enlarged view of a part D in FIG. 3(a), showing circumferential light passing ranges (u, u') and radial light passing ranges (t, t').

The compression ring according to the present invention preferably passes light in a room-temperature light tightness test defined by ISO 6621-2:2003(E). It is, of course, important that after the engine is started, the ring temperature increases immediately to produce a temperature difference between the inner and outer peripheries of the ring near the gap in particular and becomes substantially light-tight. As left and right light passing portions are shown in FIG. 3(*a*) with the gap therebetween, the light passing portions in the light tightness test are expressed by the circumferential lengths (u, u') from the gap faces (3, 3'). The range (u+u') of the light passing portions on both the left and right sides of the gap is expressed by the ratio to the inner peripheral length of the ring gauge (the same as π×d1), or (u+u')/(π×d1), which is preferably less than 35%. Radial gaps (t, t') between the outer peripheral face of the compression ring and the inner peripheral face of the ring gauge are expressed by the ratios to the nominal diameter d1 of the compression ring, or (t/d1, t'/d1), and are preferably less than 0.13%. As shown in FIG. 3(*b*), the radial gaps (t, t') refer to radial gaps t measured at outer peripheral positions (7) 1 mm away from the respective gap faces. The circumferential length ratio (u+u')/(π×d1) of the light passing range is preferably 0.1% to 12%, and yet preferably 2% to 8%. The radial gap ratios (t/d1, t'/d1) of the light passing range are preferably 0.01% to 0.1%, and yet preferably 0.02% to 0.06%.

The compression ring according to the present invention preferably includes at least one hard coating on at least the outer peripheral sliding surface. For the effect of the hard coating to be effectively exerted, a layered coating combining several hard coatings is preferably included. For example, a nitrided layer is preferably formed by nitriding the base material of the compression ring, with a chromium nitride film or a diamond like carbon (DLC) film stacked thereon. From the viewpoint of abrasion resistance, a so-called hydrogen-free DLC film containing no hydrogen is favorably used as the DLC film.

Figure 4:
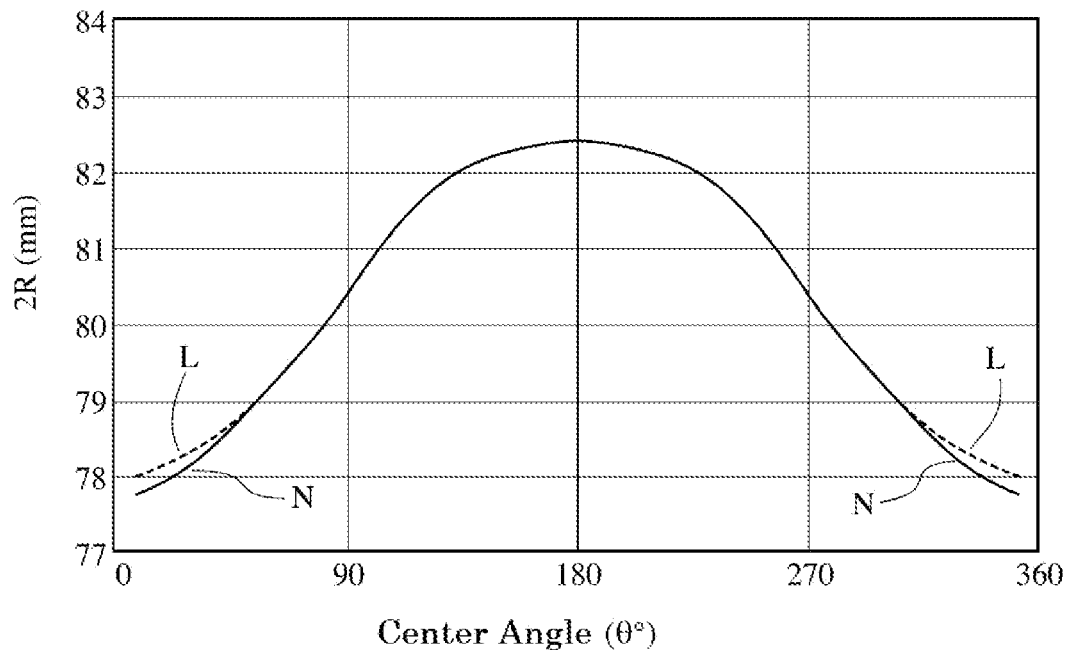
FIG. 4 is a chart related to a radius of curvature R of the outer peripheral arc of the compression ring according to the present invention in the free state shape, showing a state of distribution of 2R with respect to a center angle θ from the midpoint of the free gap.

As for the free shape of the compression ring according to the present invention, each ring having the free shape can be formed of a piston-ring steel wire using a cam forming machine. A perfectly circular coil may be formed, cut up with a grindstone, set to a jig shaped similarly to the free shape of the compression ring, and thermally treated into the free shape. The free shape is basically formed to have the largest radius of curvature at P(180°) on the side opposite to the gap and approach the radius of curvature of the cylinder toward the gap. FIG. 4 shows the relationship between the center angle θ of a compression ring having a nominal diameter d1 of 78 mm from the midpoint of the free gap and twice the radius of curvature R at the point P(θ) for the center angle θ. When compared to the 2R distribution (L: shown by a broken line) of a model where 2R (=2R1) at the gap faces matches the nominal diameter d1 of the ring, the 2R distribution (N: shown by a sold line) of the compression ring according to the present invention preferably has a smaller 2R (=2R1) in the gap end portions (0° side and 360° side) than that of the model distribution. In the present invention, the cam forming machine is adjusted or the thermal treatment jig is adjusted to form the compression ring into the free shape having such a 2R distribution.

EXAMPLES

Example 1 (E. 1)

A compression ring having a nominal diameter (d1) of 120 mm, an axial width (h1) of 2.5 mm, and a radial thickness (a1) of 4.3 mm in a keystone cross section was formed of a steel wire equivalent to JIS SUS 440B using a cam forming machine. The compression ring was further formed into an asymmetric barrel face shape by side face polishing, free gap polishing, and outer peripheral lapping, subjected to a gas nitriding treatment at 570° C. for four hours, polished to remove white layers, and then cleaned. An approximate 25-μm-thick hydrogen-free DLC film was deposited on the outer peripheral sliding surface using an arc ion plating machine with a carbon cathode (99.9% by mass of carbon). Here, the reference outer diameter of the ring and the distribution of the radii of curvature in the free shape state, which changed in each step, were measured, found out, and adjusted so that 2R1 of the final product was 0.2 mm less than d1, where R1 was the radius of curvature of the gap end portions.

[1] Measurement of 2R Distribution in Free State

Figure 5:
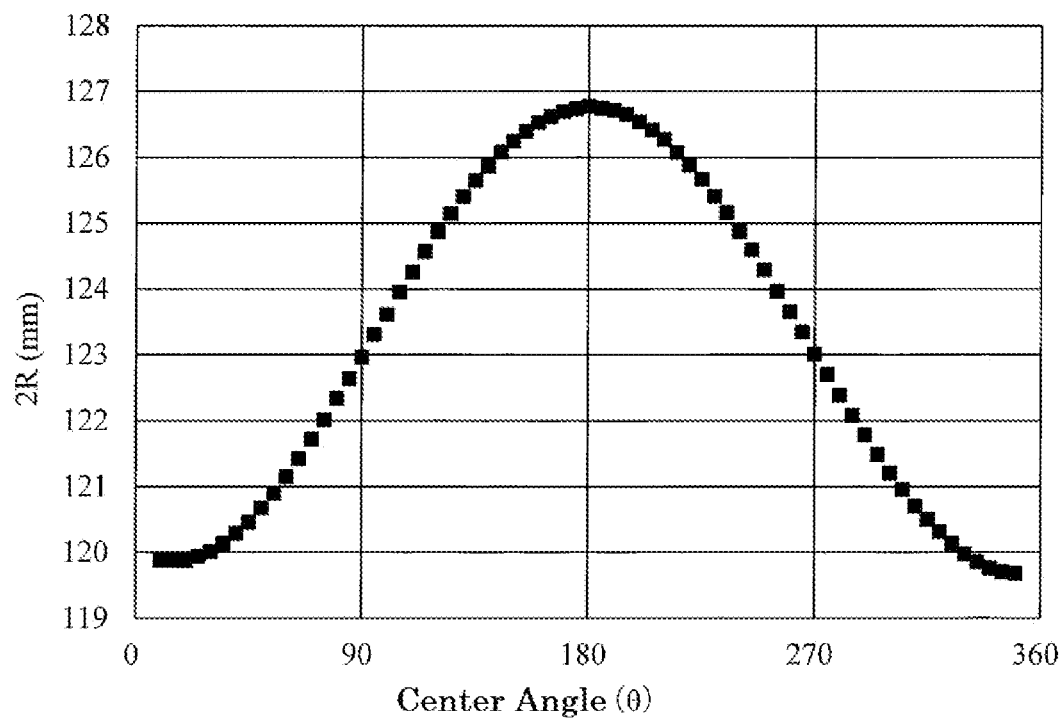
FIG. 5 is a chart showing the 2R distribution of a compression ring of Example 1 in a free state shape.

Coordinate data about points P on the outer peripheral arc of the compression ring of Example 1 was measured using a free shape measurement apparatus including a rotary table and a through-beam laser displacement meter. The radius of curvature at a P point at a center angle θ is calculated from 400 pieces of data within the range of P(θ−25°) to P(θ+25°) by the least squares method. For example, if θ is 180°, the data within the range of P(155°) to P(205°) is used. With the gap faces (3, 3') at P(8°) and P(352°), 216 pieces of data within the range of P(8°) to P(35°) are used to calculate the radius of curvature R1 of the outer peripheral arc of the gap end portion since the radius of curvature R1 is defined as the radius of curvature of the range between the gap face and P(35°) at a center angle of 35° from the midpoint of the free gap. The 2R distribution can be plotted by calculating 2R at every 5°, assuming that the radius of curvature of the gap end portion refers to that of an arc with P(10°) at the midpoint (note that the number of pieces of data on the left of P(10°) is smaller). FIG. 5 shows the 2R distribution according to Example 1. The radii of curvature R of the outer peripheral arcs of the gap end portions determined by the least squares method were 59.94 mm on the 0° side and 59.84 mm on the 360° side, and (2R−d1)/d1 was −0.0010 on the 0° side and −0.0027 on the 360° side.

[2] Measurement of Ovality

The compression ring of Example 1 was put in an 80-μm-thick annular flexible metal tape. The ring was closed to have a predetermined closed gap, and measured for d3 and d4 using an ovality meter. In Example 1, the ovality was −0.5 mm and (d3−d4)/d1 was −0.0042.

[3] Measurement of Light Passing Range

The compression ring of Example 1 was inserted into a gauge ring for a light tightness test, and both the circumferential lengths u and u' and the radial gaps t and t' of the light passing range, or range where the light from a lamp placed below passed through, were measured using a microscope (VHX-5000 manufactured by Keyence). In the light passing range of Example 1, the circumferential length u on the 0° side was 7.29 mm, and the circumferential length u' on the 360° side was 9.98 mm. The radial gap t on the 0° side was 0.022 mm, and the radial gap t' on the 360° side was 0.025 mm.

Comparative Example 1 (C.E. 1)

A compression ring coated with a DLC film was produced by the same manner as that of Example 1 except that twice the radii of curvature R1 of the gap end portions, or 2R1, of the final product were adjusted to be greater than d1 by 0.3 mm. Like Example 1, the radii of curvature R1 of the outer peripheral arcs of the gap end portions, the ovality (d3−d4), and the light passing range were measured. The radii of curvature R1 of the outer peripheral arcs of the gap end portions were 60.15 mm on the 0° side and 60.19 mm on the 360° side. (2R1−d1)/d1 was +0.0025 on the 0° side and +0.0032 on the 360° side. The ovality was −0.1 mm, (d3−d4)/d1 was −0.0008, and no light passed through.

Examples 2 to 5 (E. 2 to E. 5)

Compression rings coated with a DLC film were produced by the same manner as that of Example 1 except that twice the radii of curvature R1 of the gap end portions, or 2R1, of the final products were adjusted to be less than d1 by 0.1 mm to 0.9 mm. The compression rings of Examples 2 to 5 were measured for the radii of curvature R1 of the outer peripheral arcs of the gap end portions, the ovality (d3−d4), and the circumferential lengths u and u' and the radial gaps t and t' of the light passing range. Table 1 shows the results, including the data on Example 1 and Comparative Example 1.

TABLE 1

| | Radius of curvature of gap end portion R1, mm | | Ovality mm | Light passing range (u, u', t, t') | | | |
|---|---|---|---|---|---|---|---|
| | | | | Circumferential length u, mm | | Radial gap t, mm | |
| | 0° side | 360° side | d3 − d4 | 0° side | 360° side | 0° side | 360° side |
| Example 1 | 59.94 | 59.84 | −0.5 | 7.22 | 9.98 | 0.022 | 0.025 |
| Example 2 | 59.94 | 59.93 | −0.7 | 7.3 | 5.86 | 0.023 | 0.018 |
| Example 3 | 59.61 | 59.71 | −0.2 | 13.34 | 10.42 | 0.047 | 0.056 |
| Example 4 | 59.73 | 59.66 | −0.3 | 14.87 | 8.24 | 0.049 | 0.046 |
| Example 5 | 59.58 | 59.56 | −0.1 | 19.26 | 12.4 | 0.058 | 0.052 |
| Comparative Example 1 | 60.15 | 60.19 | −0.1 | NA | NA | NA | NA |

Table 2 shows the parameters related to the present invention, calculated from the measurement data of Table 1.

TABLE 2

| | $\dfrac{2R1 - d1}{d1}$ | | $\dfrac{d3 - d4}{d1}$ | $\dfrac{u}{\pi \times d1}$ % | | | $\dfrac{t}{d1}$ % | |
|---|---|---|---|---|---|---|---|---|
| | 0° side | 360° side | | 0° side | 360° side | Total | 0° side | 360° side |
| Example 1 | −0.0010 | −0.0027 | −0.0042 | 1.92 | 2.65 | 4.56 | 0.018 | 0.021 |
| Example 2 | −0.0011 | −0.0013 | −0.0058 | 1.94 | 1.56 | 3.49 | 0.019 | 0.015 |
| Example 3 | −0.0065 | −0.0049 | −0.0017 | 3.54 | 2.77 | 6.31 | 0.039 | 0.047 |
| Example 4 | −0.0045 | −0.0057 | −0.0025 | 3.95 | 2.18 | 6.13 | 0.041 | 0.038 |
| Example 5 | −0.0071 | −0.0074 | −0.0008 | 5.11 | 3.29 | 8.40 | 0.048 | 0.043 |
| Comparative Example 1 | 0.0025 | 0.0032 | −0.0008 | — | — | — | — | — |

[4] Engine Test 1

The compression rings of Examples 1 to 5 and Comparative Example 1 were attached to the respective cylinders of a 9.8-liter inline-six diesel engine, and an engine test was performed under an operating condition of 2,000 rpm, full load, and constant speed. Here, second rings and oil rings having been used for that engine were used. After a lapse of a predetermined time, each compression ring was measured for the amount of outer peripheral abrasion of the gap end portions (0° side and 360° side) and the side opposite to the gap (180° side). The amount of outer peripheral abrasion was measured by observing the sections of the gap end portions at positions P(17.5°) and P(342.5°) where the center angle was 17.5° and the section of the side opposite to the gap at position P(180°) under a scanning electron microscope, and measuring the thickness (y) of the DLC film at the outermost surface. Since the DLC film was a coating of approximately 25 μm, the amount of outer peripheral abrasion was calculated by (25−y) μm. Table 3 shows the results.

TABLE 3

| | Amount of abrasion, μm | | | Abrasion ratio | |
|---|---|---|---|---|---|
| | Gap end portion | | Opposite to gap | Gap end portion/ opposite to gap | |
| | 0° side | 360° side | 180° | 0° side | 360° side |
| Example 1 | 7.5 | 8.0 | 7.8 | 0.96 | 1.03 |
| Example 2 | 7.3 | 7.0 | 6.8 | 1.07 | 1.03 |
| Example 3 | 3.4 | 4.2 | 7.2 | 0.47 | 0.58 |
| Example 4 | 4.0 | 5.2 | 4.2 | 0.95 | 1.24 |
| Example 5 | 5.4 | 4.4 | 11.2 | 0.48 | 0.39 |
| Comparative Example 1 | 15.2 | 13.9 | 7.3 | 2.08 | 1.90 |

In Examples 1, 2, and 4, the ratios (hereinafter, referred to as abrasion ratios) of the amounts of abrasion on the gap end portions (0° side and 360° side) to that on the side opposite to the gap (180°) were substantially the same (0.95 to 1.24).

In Examples 3 and 5, the abrasion ratios were of the order of 0.4 to 0.6. In terms of the value of the parameter (2R1−d1)/d1 related to the radii of curvature of the gap end portions, the abrasion ratios are expected to decrease and the surface pressure at the gap is expected to drop if the (2R1−d1)/d1 is below the order of −0.005 to −0.006. At (2R1−d1)/d1 exceeding 0.0020, the abrasion ratios are approximately twice, which shows that the present invention fails to solve the problem. As for the parameter (d3−d4)/d1 related to the ovality, (d3−d4)/d1 having a negative value smaller than −0.0020 showed a favorable tendency.

Example 6 (E. 6)

A compression ring of Example 6 was produced by forming a round form coil of a steel wire equivalent to JIS SUP 12 by round form molding. The coil was cut into a single ring by using a grindstone, and the ring was then set in a jig and thermally treated and formed into the free shape. The ring was further formed into a compression ring, which had a rectangular cross-section and an outer peripheral face with an asymmetric barrel face shape and which had a nominal diameter (d1) of 82 mm, an axial width (h1) of 1.5 mm, and a radial thickness (a1) of 2.9 mm, by side face polishing, free gap polishing, and outer peripheral lapping. As a surface treatment, approximately 30 μm of CrN film was deposited on the outer peripheral sliding surface using an arc ion plating machine. The reference outer diameter of the ring and the distribution of the radii of curvature in the free shape state, which changed in each step, were measured and found out, and the thermal treatment jig was produced so that 2R1 of the final product was 0.2 mm less than d1, where R1 is the radius of curvature of the gap end portions.

Examples 7 to 9 (E. 7 to E. 9)

Compression rings coated with a CrN film were produced by the same manner as that of Example 6, except that the thermal treatment jigs were adjusted so that twice the radii of curvature R1 of the gap end portions, 2R1, of the final products ranged from "greater than d1 by 0.1 mm" to "less than d1 by 0.4 mm".

The compression rings of Examples 6 to 10 were measured for the radii of curvature R1 of the outer peripheral arcs of the gap end portions, the ovality (d3−d4), and the circumferential lengths u and u' and the radial gaps t and t' of the light passing range. Table 4 shows the results.

TABLE 4

|  | Radius of curvature of gap end portion R1, mm | | Ovality mm | Light passing range (u, u', t, t') | | | |
|  |  |  |  | Circumferential length u, mm | | Radial gap t, mm | |
|  | 0° side | 360° side | d3 − d4 | 0° side | 360° side | 0° side | 360° side |
| --- | --- | --- | --- | --- | --- | --- | --- |
| Example 6 | 40.89 | 40.91 | −0.3 | 8.41 | 6.85 | 0.008 | 0.005 |
| Example 7 | 41.06 | 41.08 | −0.1 | — | — | — | — |
| Example 8 | 40.95 | 40.93 | −0.5 | 3.22 | 5.45 | 0.002 | 0.003 |
| Example 9 | 40.84 | 40.83 | −0.4 | 11.54 | 12.32 | 0.016 | 0.017 |

Table 5 shows the parameters related to the present invention, calculated from the measurement data of Table 4.

TABLE 5

|  | $\dfrac{2R1-d1}{d1}$ | | $\dfrac{d3-d4}{d1}$ | $\dfrac{u}{\pi \times d1}$ % | | | $\dfrac{t}{d1}$ % | |
|  | 0° side | 360° side |  | 0° side | 360° side | Total | 0° side | 360° side |
| --- | --- | --- | --- | --- | --- | --- | --- | --- |
| Example 6 | −0.0028 | −0.0022 | −0.0037 | 3.27 | 2.66 | 5.93 | 0.010 | 0.006 |
| Example 7 | 0.0015 | 0.0020 | −0.0012 | — | — | — | — | — |
| Example 8 | −0.0013 | −0.0018 | −0.0061 | 1.26 | 2.12 | 3.37 | 0.002 | 0.004 |
| Example 9 | −0.0039 | −0.0041 | −0.0049 | 4.48 | 4.78 | 9.27 | 0.020 | 0.021 |

[5] Engine Test 2

The compression rings of Examples 6 to 9 were attached to the respective cylinders of a 2-liter inline-four diesel engine, and an engine test was performed under an operating condition of 2,000 rpm, full load, and constant speed. Here, second rings and oil rings having been used for that engine were used. After a lapse of a predetermined time, each compression ring was measured for the amount of outer peripheral abrasion of the gap end portions (0° side and 360° side) and the side opposite to the gap (180° side). For example, the amount of outer peripheral abrasion was measured by observing the sections of the gap end portions at positions P(17.5°) and P(342.5°) and the section of the side opposite to the gap at position P(180°) under a scanning electron microscope, and measuring the thickness (y) of the CrN film at the outermost surface. Since the CrN film was a coating of approximately 30 μm, the amount of outer peripheral abrasion was calculated by (30−y) μm. Table 6 shows the results.

TABLE 6

|  | Amount of abrasion, μm | | | Abrasion ratio | |
| --- | --- | --- | --- | --- | --- |
|  | Gap end portion | | Opposite to gap | Gap end portion/ opposite to gap | |
|  | 0° side | 360° side | 180° | 0° side | 360° side |
| Example 6 | 13.2 | 14.8 | 13.9 | 0.95 | 1.06 |
| Example 7 | 14.5 | 16.8 | 12.2 | 1.19 | 1.38 |
| Example 8 | 13.8 | 14.2 | 14.5 | 0.95 | 0.98 |
| Example 9 | 12.9 | 13.5 | 13.9 | 0.93 | 0.97 |

In Examples 6, 8, and 9, the abrasion ratios were close to 1 (0.93 to 1.03). In Example 7, the abrasion ratios were 1.19 and 1.38, and the amount of abrasion on the gap end portion side was slightly greater. However, the abrasion ratios were not as high as in Comparative Example 1, and a sufficient improvement was observed.

REFERENCE SIGNS LIST 1 compression ring
2 free gap
3 gap face
4 gap end portion
5 outer peripheral chamfered portion
6 points where the gap faces excluding the outer peripheral chamfered portions are located on the outer peripheral arc
7 outer peripheral position 1 mm away from the respective gap faces

The invention claimed is:

1. A combination comprising a compression ring, a piston, and a cylinder, wherein
the compression ring is an annular compression ring having a pair of gap faces opposed to each other to form a free gap and a nominal diameter d1 equal to an inner diameter of the cylinder to which the compression ring is attached to along with the piston,
a self tangential force of the compression ring is 5 N to 50 N, and
a radius of curvature R1 and the nominal diameter d1 of the compression ring satisfy a relationship:

$-0.01 \leq (2R1-d1)/d1 < 0.002$ where the radius of curvature R1 is that of an outer peripheral arcs of gap end portions in a free shape state before the compression ring is attached to the cylinder, and
the gap end portions are defined in ranges between the gap faces and positions where a center angle from a midpoint of the free gap is 35°.

2. The combination of the compression ring, the piston, and the cylinder according to claim 1, wherein the radius of curvature R1 and the nominal diameter d1 of the compression ring satisfy a relationship:

$-0.01 \leq (2R1-d1)/d1 < 0$.

3. The combination of the compression ring, the piston, and the cylinder according to claim 1, wherein
an ovality of the compression ring defined as a difference (d3−d4) and the nominal diameter d1 satisfy a relationship:

$-0.013 \leq (d3-d4)/d1 < 0$ where d3 is a diameter in a first axial direction through the midpoint of the closed gap and d4 is a diameter in a second axial direction orthogonal to the first axial direction when the compression ring is inserted into an annular flexible tape and the flexible tape is drawn to close the compression ring until the closed gap becomes a predetermined gap in a case where the compression ring is attached to the cylinder.

4. The combination of the compression ring, the piston, and the cylinder according to claim 1, wherein, the compression ring has less than 35% of a light passing ratio in a light tightness test defined by ISO 6621-2:2003(E), where the light passing ratio is a ratio of a circumferential length of a light passing portion excluding the closed gap to an inner peripheral length of a ring gauge used in the light tightness test, the light passing portion being between an inner peripheral face of the ring gauge and an outer peripheral face of the compression ring.

5. The combination of the compression ring, the piston, and the cylinder according to claim 4, wherein radial gaps between the outer peripheral face of the compression ring in the light passing portion and the inner peripheral face of the ring gauge at outer peripheral positions 1 mm away from the pair of gap faces are smaller than 0.13% of the nominal diameter d1.

6. The combination of the compression ring, the piston, and the cylinder according to claim 1, wherein the compression ring comprises at least one coating selected from the group consisting of a plating film, an ion plating film, and a nitrided layer on at least an outer peripheral sliding surface.

7. The combination of the compression ring, the piston, and the cylinder according to claim 6, wherein the ion plating film is at least one film selected from the group consisting of CrN, $Cr_2N$, TiN, CrCN, TiCN, and a diamond like carbon.

8. The combination of the compression ring, the piston, and the cylinder according to claim 1, wherein the radius of curvature R1 and the nominal diameter d1 of the compression ring satisfy a relationship:

$-0.004 \leq (2R1-d1)/d1 \leq -0.001$.

9. A combination comprising a compression ring, a piston, and a cylinder, wherein
the compression ring is an annular compression ring having a pair of gap faces opposed to each other to form a free gap and a nominal diameter d1 equal to an inner diameter of the cylinder to which the compression ring is attached to along with the piston,
a self tangential force of the compression ring is 5 N to 50 N, and
a radius of curvature R1 and the nominal diameter d1 of the compression ring satisfy a relationship:

$-0.01 \leq (2R1-d1)/d1 < 0.002$ where the radius of curvature R1 is that of an outer peripheral arcs of gap end portions in a free shape state before the compression ring is attached to the cylinder, and
the gap end portions are defined in ranges between the gap faces and positions where a center angle from a midpoint of the free gap is 35°; and wherein
the compression ring has less than 35% of a light passing ratio in a light tightness test defined by ISO 6621-2:2003(E), where the light passing ratio is a ratio of a circumferential length of a light passing portion excluding the closed gap to an inner peripheral length of a ring gauge used in the light tightness test, the light passing portion being between an inner peripheral face of the ring gauge and an outer peripheral face of the compression ring.

* * * * *